United States Patent
Yavorsky et al.

[15] 3,659,976
[45] May 2, 1972

[54] APPARATUS FOR MOLDING AND VULCANIZATION OF ANNULAR RUBBER ARTICLES

[72] Inventors: Arsenty Vasilievich Yavorsky, ulitsa Zaponskogo, 14v, kv. 70, Kiev; Grigory Lvovich Farber, ulitsa Kutuzova, 33a, kv.66, Tula; Grigory Andreevich Gavrilenko, ulitsa Politekhnicheskava, 31v, kv.4, Kiev, all of U.S.S.R.

[22] Filed: Aug. 21, 1970

[21] Appl. No.: 66,032

[52] U.S. Cl. ................................425/42, 249/170, 425/46, 425/47
[51] Int. Cl. ....................B29h 5/00, B29h 7/22, B29d 29/00
[58] Field of Search...................249/161, 162, 160, 170, 171, 249/172; 18/6 V, 6 R, 6 E, 4 R, 4 V, 2 V, 34 R, 42 R, 26 R, 39; 25/121 R, 128 RR

[56] References Cited

UNITED STATES PATENTS

| | | | |
|---|---|---|---|
| 1,899,393 | 2/1933 | Meyer | 18/42 R |
| 2,573,643 | 10/1951 | Hurry | 18/6 V |
| 2,599,046 | 6/1952 | Brucker | 18/6 V |
| 2,602,982 | 7/1952 | Sullivan | 18/121 X |
| 2,709,277 | 5/1955 | Dixon et al. | 18/42 R X |
| 2,730,783 | 1/1956 | Kennison | 25/128 R |

Primary Examiner—J. Howard Flint, Jr.
Attorney—Waters, Roditi, Schwartz & Nissen

[57] ABSTRACT

An apparatus for molding and vulcanization of annular rubber articles comprising a drum adapted to receive and support thereabout the articles to be treated and a mechanism for external pressing of the articles received about the drum. The mechanism for external pressing of the articles includes individual selectively heatable segments arranged concentrically about the drum and associated with drive means for displacing these segments radially of the apparatus, this drive means including an annular frame pivotally connected through pivoted arms with the segments of the mechanism for external pressing of the articles, the frame being associated with power means for effecting axial reciprocation of the frame along guiding columns.

1 Claims, 2 Drawing Figures

3,659,976

APPARATUS FOR MOLDING AND VULCANIZATION OF ANNULAR RUBBER ARTICLES

The present invention relates to apparatus for manufacturing rubber articles, and, more particularly, it relates to apparatus for molding and vulcanization of annular rubber articles.

The present invention can be used most effectively in the process of manufacture of driving Vee-belts, particularly, those having toothed internal surface, of removable tread rings for vehicle tires and of massive tires.

Known in the art is an apparatus for molding and vulcanization of annular rubber articles which comprises a drum adapted to receive thereabout an annular work holder supporting blanks to be treated, and a mechanism for external pressing of the blanks. The drum is made up by several individual selectively heatable segments associated with driving means for radial displacement of these segments. The mechanism for external pressing of the blanks also includes several individual selectively heatable segments arranged concentrically in relation to the above-mentioned drum and associated with drive means effecting radial displacement of these segments.

The last-mentioned drive means includes an annular frame connected by means of pivotable arms with the segments of the mechanism for external pressing of the articles, the annular frame being pivotably supported by the respective piston rods of a plurality of fluid power cylinders, these piston rods extending substantially tangentially of the annular frame.

When the fluid power cylinders of this known apparatus are operated, the annular frame rotates about its central axis under the action of the cylinders and displaces the segments of the mechanism for external pressing of articles radially inwardly, toward the drum, whereby the last-mentioned segments firmly embrace from outside the articles, and the molding and vulcanization operation takes place.

However, in this known apparatus any error, however slight, in the synchronization of the advance of the respective piston rods of the power cylinders invariably leads to the annular frame being translated in the plane of its rotation, simultaneously with the rotation thereof.

Should such translation take place, the segments of the mechanism for external pressing of the articles are driven radially toward the drum by different increments, and set themselves at non-uniform radial spacing from the drum, whereby the articles being treated do not acquire a correct geometrical shape.

It is an object of the present invention to eliminate this disadvantage of the known apparatus.

It is an object of the present invention to provide an apparatus for molding and vulcanization of annular rubber articles, which should positively provide for synchronous displacement of the segments of the mechanism for external pressing of articles radially toward the drum and for uniform radial spacing of these segments from the drum in the molding position of the segments.

This object is accomplished in an apparatus for molding and vulcanization of annular rubber articles comprising, in accordance with the present invention, a plurality of guiding columns along which the annular frame is adapted to be axially reciprocated in operation of said apparatus.

The present invention will be better understood from the following detailed description of an exemplary embodiment thereof, with reference being had to the accompanying drawings in which.

Figure 1:
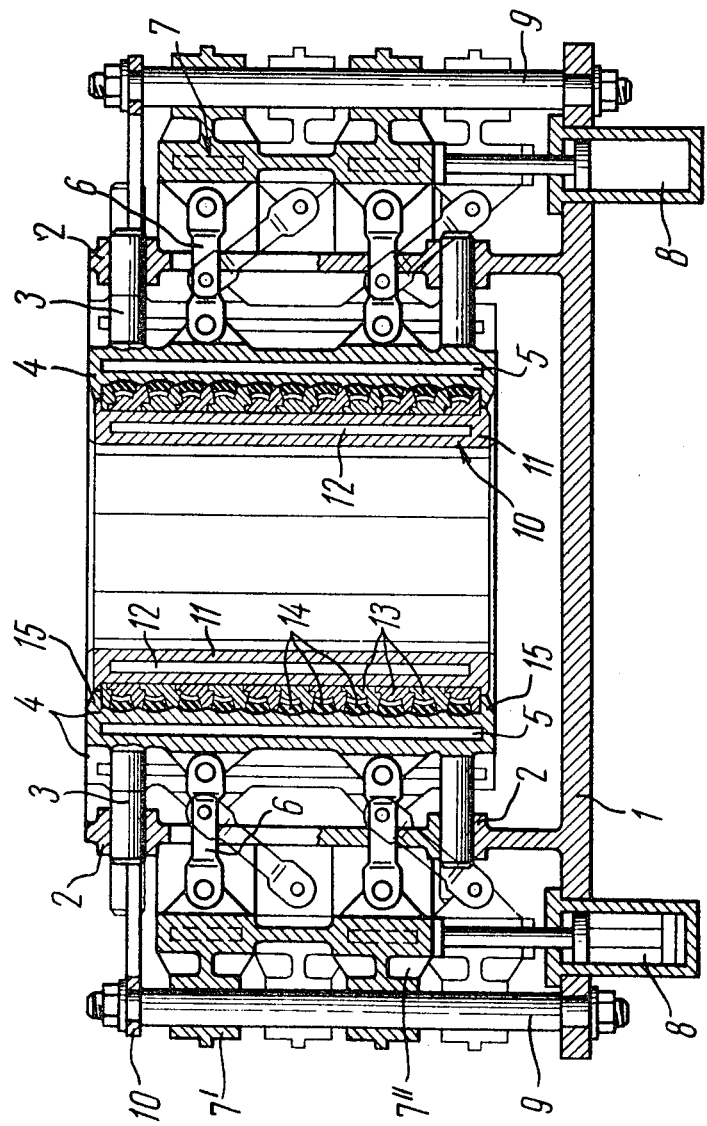
FIG. 1 is a schematic axially sectional view of an apparatus for molding and vulcanization of annular rubber articles, constructed according to the present invention.

Referring now in particular to the appended drawings, an apparatus for molding and vulcanization of annular rubber articles comprises a framework 1 (FIG. 1) having mounted thereon guiding sleeves 2 slidably receiving thereinside the respective ones of the guiding rods 3 of the segments 4 of the mechanism for external pressing of articles to be treated.

The segments 4 are provided with internal spaces 5 into which heating fluid can be supplied, or, alternatively, inside which heating means can be mounted. The segments 4 are pivotally connected by means of arms 6 with an annular frame 7 (FIGS. 1 and 2) which is actuated by any suitable driving means, e.g. by a hydraulic cylinders 8 (FIG. 1), for reciprocation axially of the apparatus along the guiding columns 9 braced together adjacent to their topmost ends by a ring 10.

Figure 2:
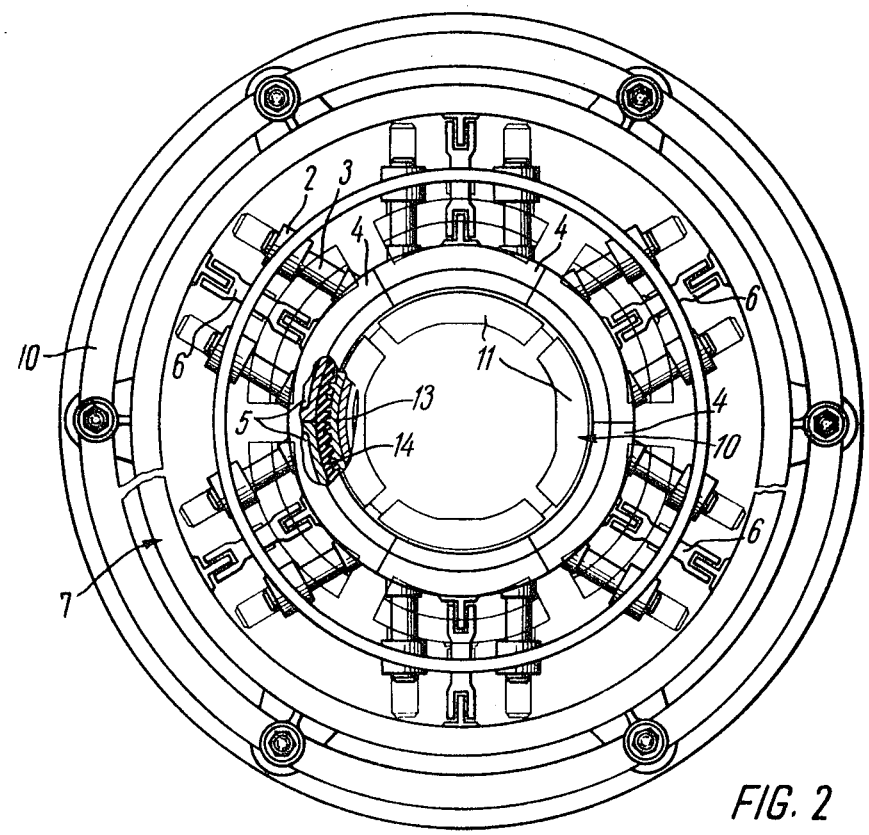
FIG. 2 is a top view of the apparatus for molding and vulcanization of rubber articles, according to the present invention.

It is expedient for the guiding columns 9 to be arranged in the herein disclosed apparatus within the confines of the annular frame 7 (the columns 8 are, however, shown in the appended drawings, FIGS. 1 and 2, as mounted exteriorly of the frame 7, which has been done for clearer visual perception of the structure of the apparatus).

The capacity of the herein disclosed apparatus may be stepped up by building up the height of the frame 7, i.e. by stacking together several annular members (7′, 7″) one on top of an other into an integral frame 7, with the height of the guiding columns 9 and the number of the arms 6 and rods 3 being correspondingly multiplied.

This can be done in order to increase the vertical dimension of the heated segments 4 and thus to increase the height of the molding surface of the apparatus.

The segments 4 are arranged concentrically in respect of a composite drum 10′ made up by a plurality of arcuate segments 11 associated with respective driving means (not shown) effecting radial displacement of the last-mentioned segments. The arcuate segments 11 have made therein respective internal cavities into which heating fluid can be supplied, or, alternatively, inside which heating means can be mounted.

The herein disclosed apparatus for molding and vulcanization of annular rubber articles operates, as follows.

The segments 11 of the drum structure 10′ are radially displaced toward the central axis of the apparatus.

The cylinders 8 are operated to drive the annular frame 7 downwardly along the guiding columns 9 into the lowermost position of the frame 7. Consequently, the segments 4 connected to the annular frame 7 by means of pivoted arms 6 are displaced radially outwardly, their respective guiding rods 3 sliding in the guiding sleeves 2. A work holder consisting of a plurality of vertically stacked rings 13 supporting thereon articles 14 to be processed is put about the composite drum 10′. Then the driving means (not shown) of the arcuate segments 11 of the composite drum 10′ are operated to drive the respective segments 11 radially away from the central axis of the drum 10′, until the segments 11 firmly engage from inside the rings 13 of the work holder, whereafter the segments 11 are retained in this position. Then the power cylinders 8 are operated to raise the annular frame 7 into the topmost position thereof, whereby the segments 4 of the external pressing mechanism are driven radially toward the central axis of the apparatus. With the annular frame 7 moving throughout its upward stroke along the guiding columns 8, the segments 4 are radially displaced in full synchronism, with uniform radial spacing of the segments 4 from the segments 11 of drum 10′.

When the inward radial motion of the segments 4 brings the arcuate projections 15 of the segments 4 into abutment with the respective topmost and lowermost rings 13 of the work hilder, the article-molding operation begins, the operation being completed, when the continuing inward radial displacement of the segments 4 brings the latter into firm lateral abutment with each other, i.e. when the segments 4 engage each other to form an uninterrupted annular structure.

When the molding operation is completed, heating fluid is supplied into the internal cavities, or spaces 5 of the segments 4 and into the internal cavities 12 of the segments 11 (or, alternatively, the heating means inside these respective cavities are turned on), and vulcanization of the articles is performed.

After the vulcanization of the articles is over, the heating fluid is driven away (or, alternatively, the heating means are turned off), and, when needed, a cooling agent can be supplied into the cavities 5 and 12. Then the segments 11 are driven radially inwardly, toward the central axis of the apparatus; simultaneously, the segments 4 are displaced radially outwardly, away from the central axis of the apparatus (by downward motion of the annular frame 7), whereafter the work holder with the vulcanized articles can be taken off the composite drum 10'.

It is quite evident that the operation of the herein disclosed apparatus can be easily rendered fully automatic, for which purpose any conventional electrical and pneumatic control means can be employed.

It can be seen from the above description that the apparatus constructed in accordance with the present invention provides for uniform radial spacing of the segments 4 of the external pressing mechanism from the segments 11 of the composite drum 10', whereby articles produced by the apparatus acquire correct geometrical shape, i.e. the quality of the articles is stepped up.

The provision of the guiding columns 9, additionally provides for increasing the height of the annular frame 7, and, consequently, the vertical dimension of the molding segments 4 and of the segments 11, i.e. for increasing the vertical size of the molding surface of the apparatus.

As a result, the productivity of the apparatus constructed in accordance with the present invention is increased, as compared with the previously known similar apparatus.

In the apparatus constructed in accordance with the present invention the effort of the hydraulic power cylinders 8 is employed to a full extent, because in this apparatus the direction of the effort of the power cylinders coincides with the direction of the displacement of the annular frame, whereas in the previously known apparatus the direction of the effort of the power cylinders was different from the direction of the displacement of the annular frame, with the resultant loss of a substantial portion of this effort.

What we claim is:

1. An apparatus for molding and vulcanization of annular rubber articles, comprising: a drum structure adapted to receive thereabout articles to be treated; a mechanism for external pressing of said articles received about said drum structure; a plurality of individual selectively heatable segments of said mechanism for external pressing of said articles, said segments being arranged concentrically in respect of said drum structure; drive means for effecting radial displacement of said segments of said mechanism for external pressing of said articles, said drive means including an annular frame; a plurality of arms pivotally connecting said annular frame with said segments of said mechanism for external pressing of said articles, said drive means further including power means associated with said annular frame for effecting axial motion of said annular frame in operation of said apparatus; a plurality of guiding columns adapted to guide said axial motion of said annular frame in operation of said apparatus.

* * * * *